F. C. DOSS.
TIRE.
APPLICATION FILED DEC. 9, 1920.
1,372,284.
Patented Mar. 22, 1921.
Fig. 1.
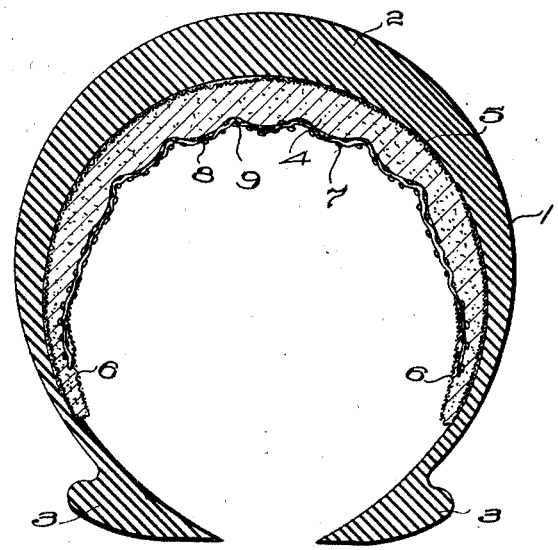
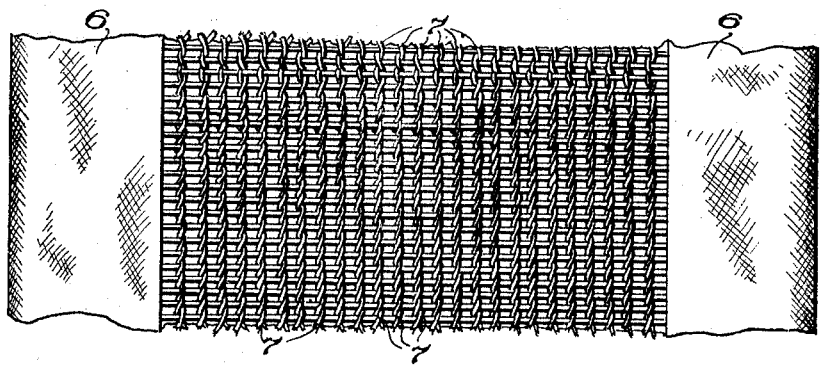
Fig. 2.
Inventor
F. C. DOSS
By
C. H. Parker, Attorney

UNITED STATES PATENT OFFICE.

FREEMAN C. DOSS, OF ATLANTA, GEORGIA.

TIRE.

1,372,284.  Specification of Letters Patent.  Patented Mar. 22, 1921.

Application filed December 9, 1920. Serial No. 429,509.

*To all whom it may concern:*

Be it known that I, FREEMAN C. Doss, a citizen of the United States, residing at Atlanta, in the county of Fulton and State of Georgia, have invented certain new and useful Improvements in Tires, of which the following is a specification.

This invention relates to tires, and it comprises the combination with a casing and inner tube, of an armor arranged between said casing and tube, said armor consisting of a semi-gelatinous material, preferably compounded with rubber, a covering of fabric arranged between said armor and casing, and a layer of coarse fabric disposed between said armor and tube, said coarse fabric being adapted to permit flow of the semi-gelatinous material to fill holes or openings formed in the inner tube.

In the present invention, I have provided an inner liner for pneumatic tires which forms a reinforcing for the casing and it may be inserted in any of the usual types of casings or shoes employed in pneumatic tires.

The layer or strata of semi-gelatinous sticky material forming the body portion of the inner liner is preferably provided with a covering of open-texture fabric arranged between it and the inner tube, whereby the semi-gelatinous material is held in contact with the tube and retained in place, but is permitted to flow to an extent that will protect the inner tube from punctures.

In the accompanying drawings, I have shown one embodiment of the invention. In this showing:

Figure 1 is a transverse sectional view of a tire casing showing the inner liner in position, and, Fig. 2 is a plan view of the inner liner showing the covering of open texture fabric.

Referring to the drawings, the reference numeral 1 designates, generally, a tire casing or shoe provided with the usual tread portion 2, and beads 3. An inflatable inner tube (not shown) is adapted to be arranged in the casing in the usual manner. Arranged between the casing and the tube is an inner liner 4, consisting of a layer or strata of a semi-gelatinous material which may or may not be compounded with rubber.

Any suitable material may be employed for this purpose, but I find it desirable to employ semi-gelatinous, sticky substances which are but slightly affected by subjection to heat or cold in their tendency to flow. As shown, the inner liner is preferably made of varying thickness corresponding to the varying thickness of the tire casing and having its maximum thickness at the tread portion of the tire.

The inner liner is provided with an outer covering 5 of close texture fabric, such as the rubberized fabric usually employed in the manufacture of tire casings. As shown, the edges 6 of the fabric are folded over and arranged on the opposite side of the body portion 4 to hold it in place. The opposite side of the inner liner is covered by an open texture fabric 7 which may be formed in any suitable manner. The texture of the fabric 7 is such as to provide relatively large openings and, in effect, form a foraminous or perforated covering. As shown, the lower face of the inner liner may be provided with a plurality of ridges 8 and depressions 9.

In the use of the device, the inner liner is arranged in the casing of the tire and the tube is then placed in position. The outer covering of fabric 5 prevents the semi-gelatinous material from flowing outwardly and the folded portions 6 arranged at the edges retain the inner liner in proper position.

The open texture fabric 7 permits the semi-gelatinous material to exude through the same, under the pressure created when the inner tube is inflated. The sticky material contacting with the inner tube forms, in effect, a patch throughout the larger portion thereof and protects it from punctures caused by nails, broken glass, and other sharp objects.

The arrangement of the ridges and grooves 8 and 9 on the inner face of the inner liner, producing a substantially corrugated surface, maintains the inner liner in close contact with the inner tube and materially assists in the proper performance of its functions.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with a tire including a casing and inner tube, of an inner liner disposed between said casing and tube, said inner liner comprising a layer of semi-gelatinous material, a covering of fabric arranged between the inner liner and the casing, and a layer of open textured fabric disposed between said inner liner and said tube.

2. An inner liner for pneumatic tires comprising a layer of semi-gelatinous material, an outer covering of fabric, the sides of said fabric covering being arranged on the opposite face of the inner liner, and a layer of open textured material arranged on said other face.

In testimony whereof I affix my signature in presence of two witnesses.

FREEMAN C. DOSS.

Witnesses:
  T. O. POOLE,
  M. E. PATTERSON.